Figure 1:
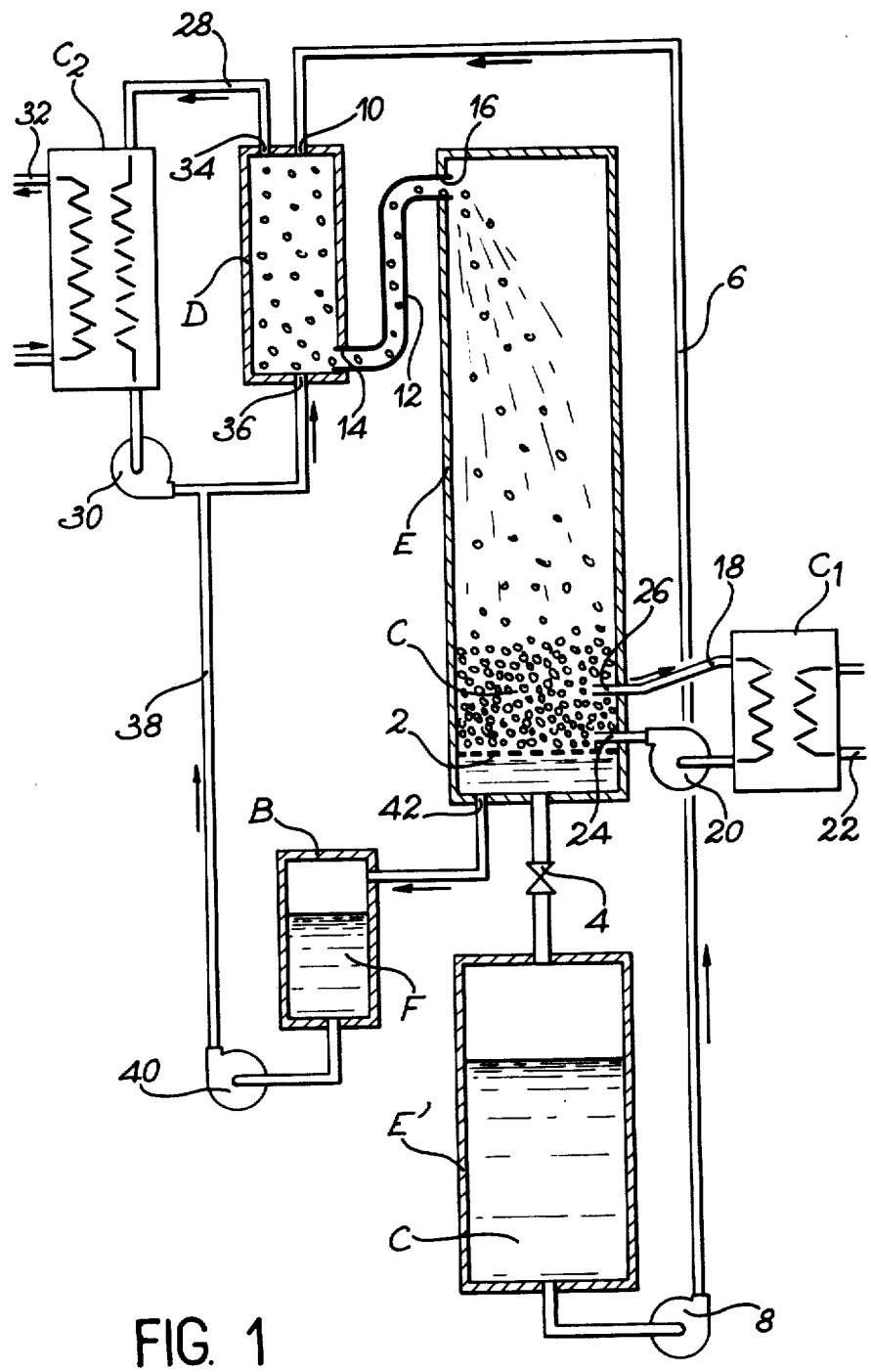

United States Patent [19]

Bricard et al.

[11] 4,383,576
[45] May 17, 1983

[54] PROCESS OF ACCUMULATION AND RESTITUTION OF HEAT

[75] Inventors: Alain Bricard, Grenoble; Jacques Chabanne, Fontaine; Bernard Duret, Grenoble, all of France

[73] Assignee: Commissariat a l'Energie Atomique, Paris, France

[21] Appl. No.: 172,242

[22] Filed: Jul. 25, 1980

[30] Foreign Application Priority Data

Aug. 2, 1979 [FR] France .................. 79 19866

[51] Int. Cl.³ .................................................. F28D 19/00
[52] U.S. Cl. ............................................. 165/104.17
[58] Field of Search ................................. 165/104.17

[56] References Cited

U.S. PATENT DOCUMENTS 4,099,557 7/1978 Bricard et al. ............... 165/104.17
4,266,598 5/1981 Mutti ............................ 165/104.17

*Primary Examiner*—Albert W. Davis, Jr.

*Attorney, Agent, or Firm*—Pearne, Gordon, Sessions, McCoy, Granger & Tilberry

[57] ABSTRACT

The present invention relates to a process of accumulation and restitution of heat, wherein heat, mainly in the form of latent heat of fusion, is stored, as required, by causing a hot heat-transfer fluid to circulate in the lower part of a bed of material in grain form with considerable latent heat of fusion, the temperature of the fluid being higher than the melting point of the material which melts under the effect of the additional calories from the fluid, and heat stored by the material in the liquid state is restituted, as required, by circulating and bringing into contact the material and the fluid, the temperature of the latter being lower than the melting point of the material, with the result that the latter yields heat to the fluid on solidifying in the form of grains before being transported into a tank for storing the material in grain form. The invention also relates to a heat accumulator for carrying out the process.

2 Claims, 2 Drawing Figures

PROCESS OF ACCUMULATION AND RESTITUTION OF HEAT

The invention relates to an improvement to the process of heat accumulation described in Applicants' French Pat. No. 74 07079 and in first certificate of addition No. 74 19072, and to heat accumulators for carrying out this process.

The heat accumulator described in Pat. No. 74 07079 functions on the principle of storing heat by fusion of pure bodies or of eutectic mixtures with congruent fusion, the heat transfers being effected between this fusible material and a heat-transfer fluid.

More precisely, the process of heat accumulation according to French Pat. No. 74 07079 is characterised in that a heat-transfer fluid F is caused to pass in direct contact with a material C with considerable latent heat of fusion, the fluid F and the material C exchanging heat at a temperature close to the melting point of the body C, with the result that, when the hot fluid F is circulated in direct contact with the material C, the latter melts and accumulates heat in the form of latent heat of fusion, cooling the fluid F and, when the cold fluid F is caused to pass in direct contact with the liquid material C, the latter solidifies, releasing heat which is transmitted to the heat-transfer fluid F.

Still according to Pat. No. 74 07079, the material C undergoes liquid-solid phase change transformations in metal storage sole plates, so that it remains permanently immobile.

First certificate of addition No. 74 19072 proposes an improvement to Pat. No. 74 07079, enabling the heat exchanges between the material C and the heat transfer fluid F to be improved by causing these two bodies to circulate either in the same direction or in counterflow, so as to increase their contact surfaces.

More precisely, the process of accumulation and restitution of heat according to the first certificate of addition No. 74 19072 is characterised in that heat, mainly in the form of latent heat of fusion, is stored as required, by circulating a hot heat-transfer fluid F in direct contact with a material C with considerable latent heat of fusion and in solid, divided form, the temperature of fluid F being higher than the melting point of the material C which melts under the effect of the additional calories from fluid F, and in that, as required, heat stored by material C in the liquid state is restituted by ciculating the latter in the form of liquid droplets in direct contact with the fluid F whose temperature is lower than the melting point of the material C, the latter solidifying in the form of grains and yielding heat to fluid F.

Although the process and device forming the subject matter of French Pat. No. 74 07079 and first certificate of addition No. 74 19072 are convenient to handle and give excellent results, it is desirable, particularly when the heat-transfer fluid F is a liquid, to limit the mass thereof when it is desired to store a large quantity of calorific energy, the latter being directly proportional to the quantity of material C used. In fact, when the heat-transfer fluid circulates as taught by the first certificate of addition in a storage tank E adapted to receive the material C in grain form, the volume of fluid employed must be equal to the volume of the tank E, after the charging step or the stage of heat accumulation by fusion of the material C, and equal to the volume of the tank E reduced by the volume of solid particles C at the end of the discharge step or step of restitution of the heat stored in the material C. By way of example, it has been calculated in the case of a heat accumulator coupled with a rapid neutron reactor and a steam generator functioning during a peak consumption period of two hours and furnishing a power of 750 MW(thermal) corresponding to an accumulated energy of 1500 MWh(thermal), the material C being the eutectic mixture NaCl-CaCl$_2$, that the volume of the storage tank E must be of the order of 20 000 m$^3$ for a porosity of the bed of solid particles of 0.5.

When the heat-transfer fluid F is a gas, the mass corresponding to this volume is relatively small and the system may be used without major drawback according to the process described in first certificate of addition No. 74 19072.

On the contrary, when the heat-transfer fluid is liquid, the mass corresponding to the volume of liquid employed becomes considerable. Thus, in the example in question, if the heat-transfer fluid is constituted by sodium, the mass of sodium corresponding to a storage tank E of 20 000 m$^3$ is 16 600 tons.

Moreover, due to the variation of volume available in the storage tank E between the charge and discharge steps, the heat accumulator according to the first certificate of addition must comprise a large-volume expansion vessel adapted to store the excess heat-transfer fluid F. In the example in question, this expansion vessel would have a capacity of 10 000 m$^3$.

It is therefore desirable to reduce the volume of heat-transfer fluid employed, particularly when it is a liquid, and to render it virtually independent of the volume of the storage tank, i.e. of the quantity of material C which it is desired to employ and of the quantity of energy which it is desired to store.

To this end, the present invention proposes an improvement to the process of heat accumulation and to the heat accumulator forming the subject matter of Pat. No. 74 07079 and of first certificate of addition No. 74 19072, the process of accumulation and restitution of heat according to the invention being characterised by the steps of storing heat, mainly in the form of latent heat of fusion, as required, by causing a hot heat-transfer fluid F to circulate in the lower part of a bed of material C in grain form with considerable latent heat of fusion, the temperature of the fluid F being higher than the melting point of the material C which melts under the effect of the additional calories from fluid F, and of restituting, as required, heat stored by the material C in the liquid state, by circulating and bringing into contact the material C and the fluid F, the temperature of the latter being lower than the melting point of the material C, with the result that the latter yields heat to the fluid F on solidifying in the form of grains before being transported into a tank E for storing the material C in grain form.

The heat-transfer fluid F circulating solely in the lower part of the bed of material C in grain form during the charging phase, and the fluid F and the material C in the liquid state being brought into contact outside the tank E storing the material C in grain form, the volume of the heat-transfer fluid F may thus be reduced and limited to a value virtually independent of the dimensions of the storage tank E.

The invention lies mainly in the fact that the material C is circulated in the form of grains or in liquid form, and that the volume of the heat-transfer fluid F is limited to a relatively low value independent of the volume of the storage tank E.

According to a preferred embodiment of the invention, the hot fluid E circulates from the bottom of the bed of material C in grain form over a height corresponding to a fraction of the maximum height of this bed, or for example about 1/20th. In fact, it has been observed from experiment that the fusion of the material C during the charging phase is essentially effected in the low part of the bed of material C, over a height of the order of 1/20th of the total height thereof, and is accompanied by a progressive and regular settling of the bed. In the hypothesis described hereinabove by way of example, the volume of sodium is thus limited to about 500 m$^3$.

According to a first variant embodiment of the invention, the hot fluid F is in direct contact with the low part of the bed of material C in grain form.

According to a second variant, the hot fluid F circulates in an exchanger embedded in the low part of the bed of material C in grain form.

According to another feature of the invention, at least part of the fluid F is used for transporting the grains formed upon solidification of the material C in the storage tank E.

According to a first variant of the invention, the fluid F circulates in counter-flow with respect to the material C in liquid form, part of the fluid F being used for transporting the grains resulting from the solidification of the material C in the storage tank E, whilst the rest of the fluid F is conveyed towards a heat restitution exchanger $C_2$.

According to a second variant of the invention, the fluid F and the material C in liquid form circulate in the same direction, all the fluid F being used for transporting the grains resulting from solidification of the material C in the storage tank E before being conveyed towards a heat restitution exchanger $C_2$.

In accordance with a secondary feature of the invention, the fluid F is chosen from the group including water, light oils, polyphenyls and substituted derivatives thereof; molten light metals such as potassium, sodium and alloys thereof; gases.

According to another secondary feature of the invention, the material C is chosen from the group including fluorides, chlorides and the hydroxides of alkali and alkaline-earth metals, and the eutectic mixtures of these materials.

The present invention also relates to a heat accumulator with latent heat of fusion and direct contact, for carrying out the process which has just been described, characterised in that it comprises a storage tank E adapted to contain the bed of material C in grain form, means for circulating the hot fluid F in the lower part of the tank E, means for circulating, in direct contact, the liquid material C and the fluid F in a discharge exchanger D communicating with the upper part of the tank E and means for heating and cooling the fluid F.

In accordance with a secondary feature of the invention, the accumulator further comprises a second storage tank E' adapted to contain the liquid material C, communicating with the lower end of the tank E via a valve.

According to a preferred embodiment of the invention, the accumulator comprises:
- a pumping circuit connecting the storage tank E' an opening formed in the upper part of the discharge exchanger D,
- a charging circuit constituting the secondary circuit of a heat exchanger $C_1$, and of which a part is disposed inside the storage tank E, in the lower part of the bed of the material C contained in the latter, over a height corresponding to a fraction of the maximum height of this bed,
- a discharge circuit constituting the primary circuit of a heat exchanger $C_2$ and of which a part is constituted by the discharge exchanger D,
- a circuit for transporting the material C in grain form formed in the discharge exchanger D, comprising at least one common part with the discharge circuit, connecting an opening formed in the lower part of the discharge exchanger D to an opening formed in the upper part of the storage tank E and connecting an opening formed in the lower part of the latter to the discharge exchanger D via an expansion vessel B, and in that
- each of these circuits comprises at least one pump.

According to a first variant embodiment of the invention, the charging circuit opens into the storage tank E through two openings, so that the heat-transfer fluid F circulating in this circuit is in direct contact with the lower part of the bed of material C.

In accordance with a second variant of the invention, the charging circuit constitutes the primary circuit of a heat exchanger formed in the storage tank E in the lower part of the bed of material C.

According to another variant of the invention, the discharge circuit connects an opening formed at the upper end of the discharge exchanger D to an opening formed at the lower end of the discharge exchanger D via the heat exchanger $C_2$, so that the heat-transfer fluid F and the material C circulate in counter-flow in the discharge exchanger D, and the circuit for transporting the material C connects the opening formed in the lower part of the storage tank E to the discharge circuit upstream of the discharge exchanger D, so that a part of the heat-transfer fluid F circulating in the latter is used for transporting in the storage tank E the grains of material C formed in the discharge exchanger D.

According to yet another variant of the invention, the discharge circuit and the circuit transporting the material C are constituted by a single circuit connecting the opening formed in the lower part of the storage tank E to an opening formed in the upper part of the discharge exchanger, via the heat exchanger $C_2$ and the expansion vessel B, so that the heat-transfer fluid F and the material C circulate in the same direction in the discharge exchanger D and all the fluid F is used for transporting in the storage tank E the grains of material C formed in the discharge exchanger D.

Figure 2:
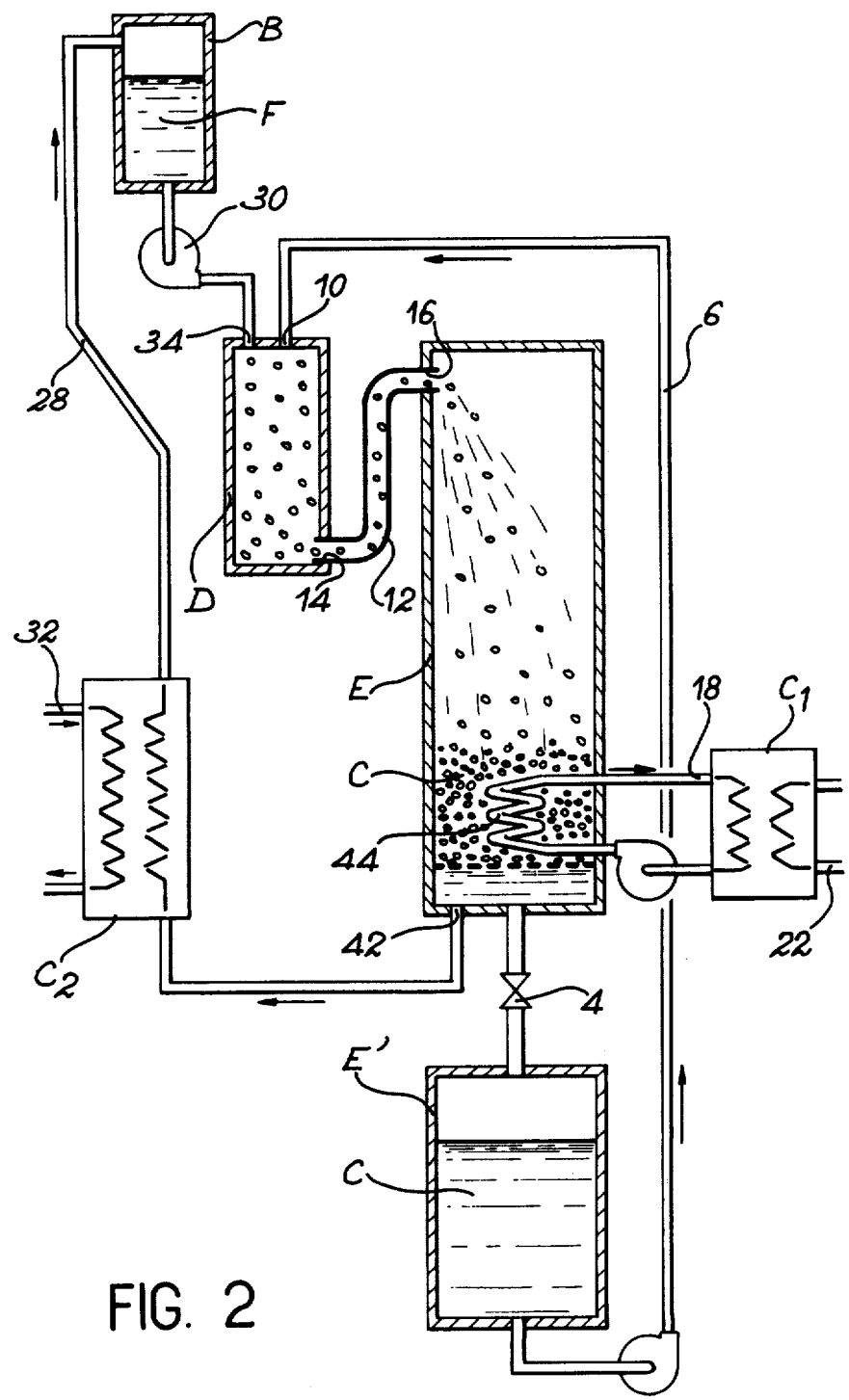

The invention will be more readily understood on reading the following description with reference to the accompanying drawings, in which:

FIG. 1 schematically shows a heat accumulator with latent heat of fusion produced in accordance with the teachings of the present invention, and FIG. 2 shows a variant embodiment of the accumulator of FIG. 1.

Referring now to the drawings, in the embodiment of the invention shown in FIG. 1, the heat accumulator comprises a tank E for storing the material C in the form of grains and a tank E' for storing the material C in liquid form. A filter 2 is disposed in the lower part of the tank E in order to retain the bed constituted by the material C in grain form. The tank E is disposed above tank E' and communicates therewith via a valve 4. The tank E′ is heat-insulated and heating means (not shown) such as a resistor may be provided so as to maintain the material C in liquid form in the tank E′. A pumping circuit comprising a pipe 6 and a pump 8 connects the storage tank E′ to an opening 10 made in the top of a discharge exchanger D. The discharge exchanger D is located near the top part of the storage tank E with which it communicates via a pipe 12 connecting an opening 14 formed in the lower part of the discharge exchanger D to an opening 16 opening in the top of the storage tank E. The section of the pipe 12 is chosen so as to allow passage of the material C in the form of granules.

The heat accumulator according to the invention further comprises a charging circuit comprising a pipe 18 and a pump 20, this charging circuit constituting the secondary circuit of a heat exchanger $C_1$ whose primary circuit 22 has a flow of liquid passing therethrough, which is previously heated by a source of heat, such as a thermal or nuclear power station or solar radiation. In accordance with the invention, the charging circuit also comprises a part located inside the storage tank E, in the lower part of this tank. In the embodiment shown in FIG. 1, the exchange of heat between the heat-transfer fluid F conveyed in pipe 18 and the material C is effected by direct contact, so that the charging circuit opens through an inlet opening 24 and through an outlet opening 26 into the tank E, the openings 24 and 26 being located respectively at the lower end of the pile formed by the material C and at a distance substantially equal to 1/20th of the maximum total height of this pile above its lower end.

The heat accumulator according to the invention further comprises a discharge circuit comprising a pipe 28 and a pump 30 and constituting the primary circuit of a heat exchanger $C_2$ whose secondary circuit 32 supplies a user installation (not shown). In the variant embodiment shown in FIG. 1, the discharge circuit connects an opening 34 made in the top of the discharge exchanger D to an opening 36 made in the lower part of this exchanger.

The heat accumulator according to the invention also comprises a circuit for transporting the material C in grain form formed in the discharge exchanger D, this circuit comprising pipe 12, part of the pipe 28 located upstream of the opening 36, a pipe 38, a pump 40 and an expansion vessel B. The pipe 38 connects an opening 41 formed in the lower part of the storage tank E to the pipe 28, upstream of opening 36. Means (not shown) are provided for separating the fluid F flowing through 42 from the molten material C evacuating through 4.

The functioning of the accumulator which has just been described with reference to FIG. 1 is as follows:

During the step of charging the accumulator or of heat accumulation, the primary circuit 22 of the exchanger $C_1$ has a flow of hot liquid passing therethrough, which exchanges heat with the fluid F circulating in the charging circuit, i.e. in the pipe 18 and in the lower part of the storage tank E between the inlet opening 24 and the outlet opening 26. The fluid F thus reheated liquefies the lower part of the bed formed by the material C in grain form, which then flows in liquid form into tank E′ after the valve 4 has been opened. The material C in the form of solid particles remaining in the tank E undergoes a progressive and regular settling such that all the material C in grain form comes progressively in the bottom of the tank E where it is liquefied in proportion by the heat-transfer fluid circulating in the charging circuit and previously heated in the exchanger $C_1$.

In the course of the discharge phase, i.e. when it is desired to recover part of the energy stored, the liquid material C contained in the tank E′ is conducted through pipe 6 up to the opening 10 formed in the top of the discharge exchanger D. At the same time, the heat-transfer fluid contained in the expansion vessel B is conducted through pipe 38 and pipe 28 up to the opening 36 formed in the lower part of the exchanger D. The liquid material C and the heat-transfer fluid F thus circulate in counter current inside the exchanger D, with the result that the fluid F heats up and the material C solidifies in the form of grains. The major part of the reheated fluid F is evacuated from the exchanger D through the opening 34 and conducted through pipe 28 up to the exchanger $C_2$, in which this heat is recovered by the fluid circulating in the circuit 32 and conducted towards a user installation (not shown). As shown in FIG. 1, the rest of the fluid F is used for transporting the grains of material C formed in the exchanger D up to the opening 16 formed at the top of the storage tank E, through pipe 12. The part of the fluid F used for transporting the grains of material C formed in the exchanger D inside the tank E is recycled towards the expansion vessel B through the opening 42 made at the bottom of tank E.

The embodiment shown in FIG. 2 illustrates a variant of the charging circuit and a variant of the discharge circuit of the device shown in FIG. 1.

In the embodiment shown in FIG. 2, the part of the charging circuit disposed inside the tank E for storing the material C in the form of grains is constituted by a heat exchanger disposed between the lower end of the bed formed by the material C and a level located at about 1/20th of the maximum total height occupied by this bed above its lower end. Thus, the pipe 18 extends inside the tank E, for example by a spiral part 44 embedded in the bed of material C, so that the heat exchange between the heat-transfer fluid F circulating in the pipe 18 and the material C in grain form is effected via the exchanger thus constituted.

In addition, in the embodiment shown in FIG. 2, the discharge circuit and the circuit for transporting the material C in grain form formed in the discharge exchanger D are constituted by a single circuit, so that the liquid material C and the heat-transfer fluid F circulate in counter flow inside the exchanger D. More precisely, this single circuit comprises a pipe 28 connecting an opening 42 made at the lower end of the tank E to an opening 34 formed at the upper end of the exchanger D, via the exchanger $C_2$, of which this circuit constitutes the primary circuit, the expansion vessel B and the pump 30.

In the course of the charging phase of the accumulator shown in FIG. 2, the functioning is identical to that of the accumulator shown in FIG. 1. Thus, the heat coming from a source of energy such as a thermal or nuclear power station is conducted up to exchanger $C_1$ through pipe 22, so that the heat-transfer fluid F circulating in the pipe 18 is heated and, via the spiral part 44, causes the material C in grain form, which is located in the lower part of the tank E to melt, this material being evacuated in liquid form into the storage tank E′ via the valve 4. Means (not shown) separate the fluid F flowing through 42 from the molten material C evacuating through 4.

In the course of the discharge phase, the material C in liquid form contained in the tank E' is conducted through pipe 6 up to the opening 10 made at the top of exchanger D. At the same time, the heat-transfer fluid F contained in the expansion vessel B is conducted through pipe 28 up to the opening 34 also made in the top of the exchanger D. The material C and the fluid F thus circulate in the same direction inside the exchanger D, so that the fluid F heats up and the material C solidifies in the form of grains. Due to the arrangement adopted in FIG. 2, all the heat-transfer fluid F admitted into the exchanger D is used for transporting the material C in grain form in the tank E via the opening 14, pipe 12 and opening 16. The heat-transfer fluid heated by the material C is then recycled through the opening 42 made in the lower part of the tank E and conducted up to the exchanger $C_2$ in which the heat accumulated in the fluid F is transferred to the fluid circulating in the secondary circuit 32 and conducted to a user installation (not shown).

In the two embodiments of the invention which have just been described with reference to FIGS. 1 and 2, the volume of the heat-transfer fluid necessary for effecting the charging and discharge operations is limited during the charging by effecting the heat exchange between this fluid and the material C in grain form in the lower part of the bed of material and, during discharge, by effecting the heat transfer between the material C and the fluid F not directly inside the tank E, but in an annexed exchanger D whose volume may easily be limited and rendered virtually independent of the volume of material C used, i.e. of the quantity of heat which it is desired to store by means of the accumulator according to the invention.

Of course, the invention is not limited to the embodiments which have just been described by way of examples, but covers all the variants thereto. The variants of the charging circuit and of the discharge circuit illustrated in FIGS. 1 and 2 may thus be combined differently, the variant of the charging circuit shown in FIG. 2 being for example adaptable on the accumulator shown in FIG. 1, and vice versa. Similarly, the charging and discharge circuits shown independently in FIGS. 1 and 2 may communicate via valves, so that the fluid F contained in the expansion vessel may be used both for the charging operations and for the discharge operations.

The functioning of the installation has been described in the case of the fusible material C, non-miscible with the heat-transfer fluid F, having a density greater than the latter. In the contrary case, the device is caused to function with the streams flowing in the same direction during the discharge operation; during the charging operation, the fusible and molten material passes through an opening provided with means for separating the fluid F from the molten material C.

What is claimed is:

1. A heat accumulator with latent heat of fusion for performing a process of accumulation and restitution of heat including the steps of storing heat, mainly in the form of latent heat of fusion, as required, by causing a hot heat-transfer fluid to circulate in the lower part of a bed of material in grain form with considerable latent heat of fusion, the temperature of the fluid being higher than the melting point of the material which melts under the effect of the additional calories from the fluid, and of restituting, as required, heat stored by the material as a liquid, by circulating and bringing into contact the material and the fluid, the temperature of the fluid being lower than the melting point of the material, with the result that the material yields heat to the fluid on solidifying in the form of grains before being stored in a tank for storing the material in grain form, the heat accumulator comprising:

a first storage tank adapted to contain in its lower part a bed of the said material in grain form, means for circulating said fluid at said higher temperature in the lower part of the tank, means for circulating in direct contact the liquid material and the fluid in a discharge exchanger communicating with the upper part of said tank, and means for heating and cooling the fluid, the accumulator further comprising a second storage tank adapted to contain the liquid material, the second storage tank communicating with the said upper part of the first storage tank via a valve, the accumulator further comprising:

a pumping circuit connecting the second storage tank to an opening formed in an upper part of said discharge exchanger, a charging circuit constituting a secondary circuit of a heat exchanger, and of which a part is disposed inside the storage tank, in the lower part of the bed of material contained in the latter, over a height corresponding to a fraction of the maximum height of said bed, a discharge circuit constituting a primary circuit of a heat exchanger and of which a part is constituted by the discharge exchanger, a circuit for transporting the material in grain form formed in the discharge exchanger, the said circuit for transporting comprising at least one common part with the discharge circuit, connecting an opening formed in the lower part of the discharge exchanger to an opening formed in the upper part of the first storage tank and connecting an opening formed in the lower part of the first storage tank to the discharge exchanger via an expansion vessel, each of said circuits including at least one pump.

2. The accumulator of claim 1, wherein the discharge circuit and the circuit transporting the material are constituted by a single circuit connecting the opening formed in the lower part of the storage tank to an opening formed in the upper part of the discharge exchanger, via the heat exchanger and the expansion vessel, so that the heat-transfer fluid and the material circulate in the same direction in the discharge exchanger and all the fluid is used for transporting in the storage tank the grains of material formed in the discharge exchanger.

* * * * *